United States Patent [19]

Ohtake

[11] Patent Number: 5,606,460
[45] Date of Patent: Feb. 25, 1997

[54] ZOOM LENS

[75] Inventor: Motoyuki Ohtake, Ohmiya, Japan

[73] Assignee: Nikon Corporation, Tokyo, Japan

[21] Appl. No.: 363,339

[22] Filed: Dec. 23, 1994

[30] Foreign Application Priority Data

Dec. 28, 1993 [JP] Japan .................................. 5-353454
[51] Int. Cl.$^6$ ................................................. G02B 15/14
[52] U.S. Cl. .......................... 359/689; 359/683; 359/686
[58] Field of Search ..................................... 359/689, 690, 359/683, 686

[56] References Cited

U.S. PATENT DOCUMENTS

| | | | |
|---|---|---|---|
| 3,615,125 | 6/1968 | Higuchi et al. | 359/690 |
| 3,788,731 | 1/1974 | Sugiura et al. | 359/689 |
| 3,790,255 | 2/1974 | Shoemaker | 359/689 |
| 4,063,800 | 12/1977 | Iizuka et al. | 359/690 |
| 4,465,342 | 8/1984 | Tanaka et al. | 359/690 |
| 4,466,708 | 8/1984 | Betensky | 359/690 |
| 4,726,668 | 2/1988 | Nakayama | 359/689 |
| 4,867,545 | 9/1989 | Wakimoto et al. | 359/689 |

FOREIGN PATENT DOCUMENTS

| | | |
|---|---|---|
| 2-73211 | 3/1990 | Japan . |
| 3-39920 | 2/1991 | Japan . |

*Primary Examiner*—Scott J. Sugarman
*Attorney, Agent, or Firm*—Shapiro and Shapiro

[57] ABSTRACT

Disclosed is a zoom lens comprising at least three movable lens units. The zoom lens comprises a first lens unit disposed closest to an object side and having positive refractive force. The first lens unit includes a positive cemented lens constituted by a positive lens element and a negative lens element, with a concave side of the cemented surface facing the object side. The zoom lens also comprises a last lens unit disposed closest to an image side. Upon zooming from a wide angle end to a telephoto end, at least the first lens unit and the last lens unit move toward the object side so as to increase an air gap between the first lens unit and a lens unit adjacent to the first lens unit on the image side but to decrease an air gap between the last lens unit and a lens unit adjacent to the last lens unit on the object side. The zoom lens satisfies the following condition:

$$0.7 < f1/(fw \cdot ft)^{1/2} < 1.4$$

where f1 is the focal length of the first lens unit, fw is the focal length of the entire lens system at the wide angle end, and ft is the focal length of the entire lens system at the telephoto end.

12 Claims, 16 Drawing Sheets

SPHERICAL ABERRATION

ASTIGMATISM

DISTORTION

SPHERICAL ABERRATION

H=5.5(FN=5.7)

ASTIGMATISM

Y=21.6

DISTORTION

Y=21.6

TRANSVERSE ABERRATION

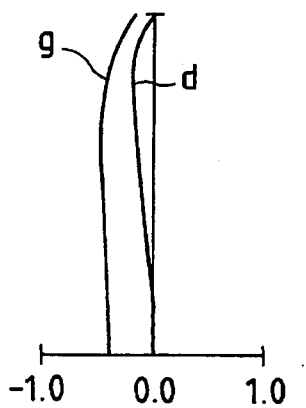
FIG. 5A
SPHERICAL ABERRATION
H=6.4(FN=7.7)
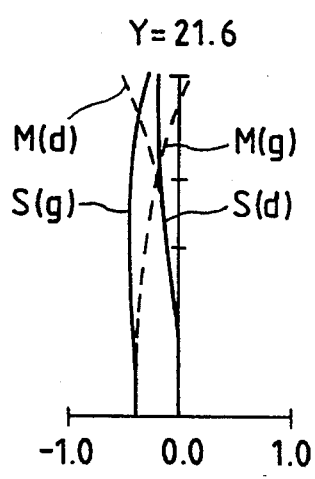
FIG. 5B
ASTIGMATISM
Y=21.6
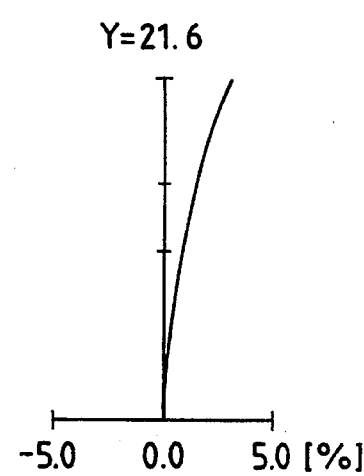
FIG. 5C
DISTORTION
Y=21.6
FIG. 5D
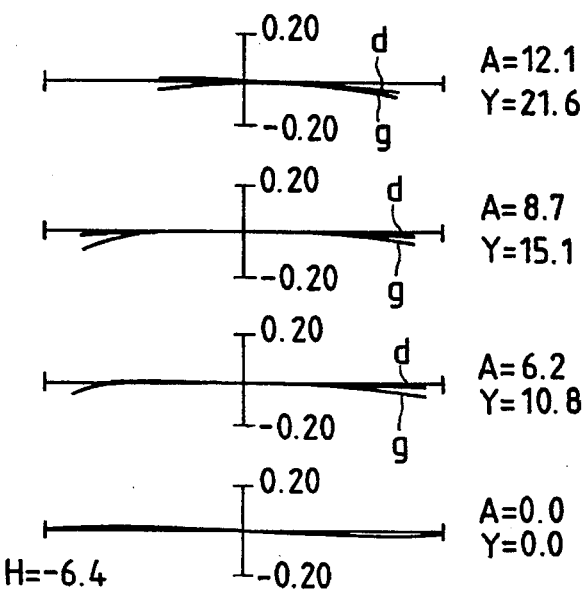
TRANSVERSE ABERRATION

SPHERICAL ABERRATION

ASTIGMATISM

DISTORTION

SPHERICAL ABERRATION
H=6.1(FN=6.8)

ASTIGMATISM
Y=21.6

DISTORTION
Y=21.6

SPHERICAL ABERRATION
H=7.0(FN=8.0)

ASTIGMATISM
Y=21.6

DISTORTION
Y=21.6

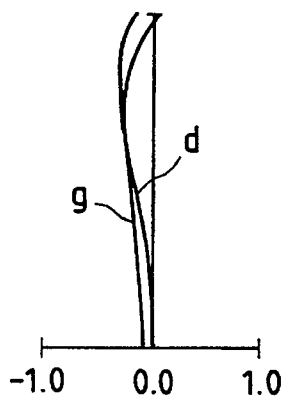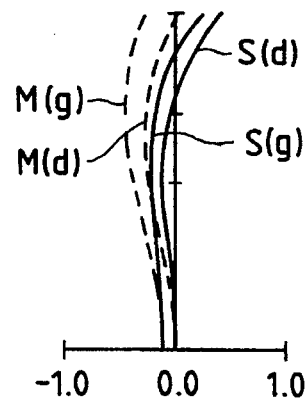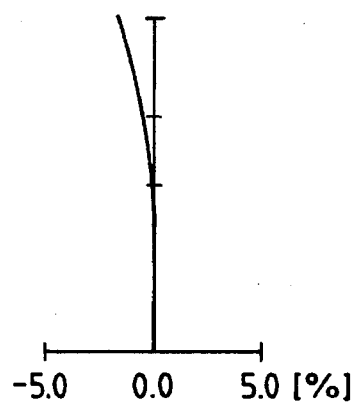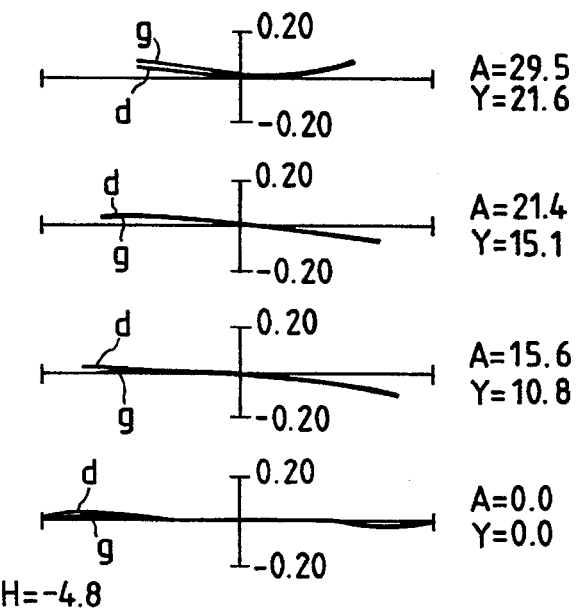

SPHERICAL ABERRATION

ASTIGMATISM

DISTORTION

SPHERICAL ABERRATION

H=6.9(FN=8.0)

-1.0  0.0  1.0

ASTIGMATISM

Y=21.6

-1.0  0.0  1.0

DISTORTION

Y=21.6

-5.0  0.0  5.0 [%]

TRANSVERSE ABERRATION

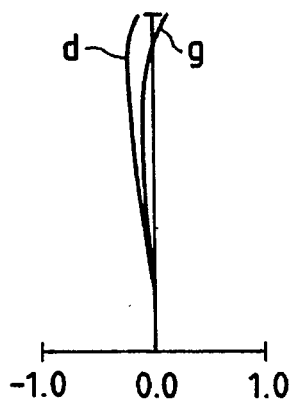
FIG. 18A
SPHERICAL ABERRATION
H=4.7 (FN=4.1)
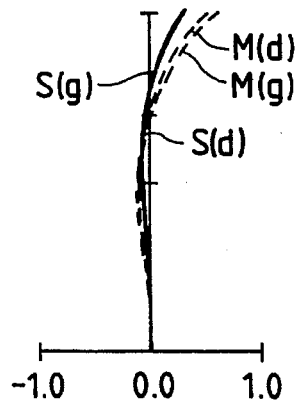
FIG. 18B
ASTIGMATISM
Y=21.6
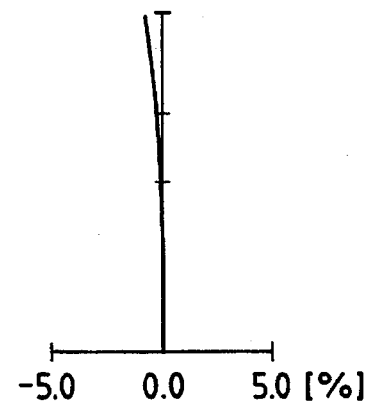
FIG. 18C
DISTORTION
Y=21.6
FIG. 18D
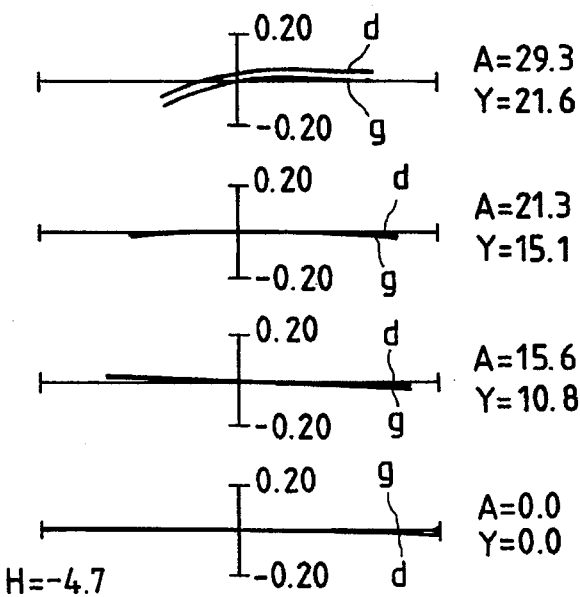

SPHERICAL ABERRATION

ASTIGMATISM

DISTORTION

SPHERICAL ABERRATION

ASTIGMATISM

DISTORTION

ZOOM LENS

BACKGROUND OF THE INVENTION

1. Field of the Invention

The present invention relates generally to a zoom lens and, more particularly, to a zoom lens suitable for use with a lens shutter type camera or the like.

2. Related Background Art

In recent years, a zoom lens has been dominated in the sector of photographing lenses of a lens shutter type camera.

Also, with a higher performance of the zoom lens, a variety of zoom types have been proposed. Further, because of an advancement of technology for a lens barrel in recent years, there have been proposed a variety of zoom types in which high zoom ratio is attained by use of a zoom lens constructed of three or more movable lens units, a so-called multi-unit zoom lens.

Given first is a generality about the multi-unit zoom lens including the three or more movable lens units.

In the multi-unit zoom lens, there increases freedom for selecting a zooming locus of each lens unit upon zooming from a wide angle end to a telephoto end, and, therefore, freedom in terms of correcting an aberration also increases. Further, because lens units changing magnification for zooming are increased, it is possible to attain a higher performance while increasing a zooming ratio. There has hitherto existed a problem in which a structure of a lens barrel becomes intricate with an increment in the number of movable elements. This problem is, however, overcome to some extent owing to the advancement of the technology for the lens barrel in recent years.

Hitherto, in the zoom lens with no restriction of a back focus, a negative lens unit has been disposed closest to an image side in order to reduce the total length of the lens system and to make the lens size small. The zooming is effectively performed by augmenting a variation in the back-focal distance upon zooming from the wide angle end to the telephoto end.

Further, a positive lens unit is disposed closest to the object side in the lens system, thereby attaining the reduction in the total length at the telephoto end.

From the above, a positive/positive/negative 3-unit zoom lens and a positive/negative/positive/negative 4-unit zoom lens may be specifically cited as a multi-unit zoom lens capable of increasing the zoom ratio and suitable for the down-sizing, and a variety of proposals pertaining thereto have been made.

The positive/positive/negative 3-unit zoom lens is constructed of, sequentially from the object side, a first lens unit having refractive power, a second lens unit having the positive refractive power and a third lens unit having negative refractive power. This zoom lens is constructed so as to, upon zooming from the wide angle end to the telephoto end, increase an air gap between the first lens unit and the second lens unit but to decrease an air gap between the second lens unit and the third lens unit (e.g., Japanese Patent Application Laid-Open No. 2-73211).

On the other hand, the positive/negative/positive/negative zoom lens is constructed of, sequentially from the object side, a first lens unit having the positive refractive power, a second lens unit having the negative refractive power, a third lens unit having the positive refractive power and a fourth lens unit having the negative refractive power. This zoom lens is constructed so as to, upon zooming from the wide angle end to the telephoto end, increase an air gap between the first lens unit and the second lens unit but to decrease both an air gap between the second lens unit and the third lens unit and an air gap between the third lens unit and the fourth lens unit (e.g., Japanese Patent Application Laid-Open No. 3-39920).

Also, in the zoom lens with no restriction in terms of the back-focal distance that is used for a lens shutter type camera, it is required for attaining the down-sizing of the camera body to reduce both a size of each lens and a thickness of the lens system (collapse lens thickness) when collapsed in the camera body. In this case, there are reduced both a length (total lens thickness) of the lens system along an optical axis extending from the closest-to-object surface to the closest-to-image surface and a thickness of each lens unit. These reductions are effective in the decrease in the collapse lens thickness and, in turn, the down-sizing of the camera body.

However, in the conventional multi-unit zoom lens such as the positive/positive/negative 3-unit zoom lens and the positive/negative/positive/negative 4-unit zoom lens, the negative lens element of the first lens unit is disposed closest to the object side in order to well correct a positive distortion at the wide angle end and obtain a sufficient back-focal distance. Then, if the first lens unit is constructed of two lens elements, a negative spherical aberration is insufficiently corrected. A well-corrected negative spherical aberration entails nothing but to increase the number of the constructive lens elements or to make the lens surface aspherical. As a result, there arises an inconvenience of being insufficient in terms of simplifying the configuration and reducing the costs.

SUMMARY OF THE INVENTION

It is a primary object of the present invention, which was devised in view of the problems given above, to provide a zoom lens exhibiting an excellent imaging performance while simplifying a configuration, reducing costs and attaining down-sizing.

According to one aspect of the present invention, there is provided a zoom lens comprising: at least three pieces of movable lens units including a first lens unit G1 disposed closest to an object side and having positive refractive force and a last lens unit GE disposed closest to an image side. It would be preferable that the last lens unit have negative refractive power. Upon zooming from a wide angle end to a telephoto end, at least the first lens unit G1 and the last lens unit GE move toward the object side so as to increase an air gap between the first lens unit G1 and a lens unit adjacent to the first lens unit G1 on the image side but to decrease an air gap between the last lens unit GE and a lens unit adjacent to the last lens unit GE on the object side. The first lens unit G1 includes a positive cemented lens L1 constituted by a positive lens element L11 and a negative lens element L12, with a concave side of the cemented surface facing the object side. The zoom lens satisfies the following condition:

$$0.7 < f1/(fw \cdot ft)^{1/2} < 1.4$$

where f1 is the focal length of said first lens unit, fw is the focal length of the entire lens system at the wide angle end, and ft is the focal length of the entire lens system at the telephoto end.

According to another aspect of the present invention, there is provided a zoom lens comprising in the following order from the object side: a first lens unit G1 having positive refractive power, a second lens unit G2 having the positive refractive power and a last lens unit GE having negative refractive power. Upon zooming from a wide angle end to a telephoto end, at least the first lens unit G1 and the last lens unit GE move toward the object side so as to increase an air gap between the first lens unit G1 and the second lens unit G2 but to decrease an air gap between the second lens unit G2 and the last lens unit GE.

According to still another aspect of the present invention, there is provided a zoom lens comprising in the following order from the object side: a first lens unit G1 having positive refractive power, a second lens unit G2 having positive refractive power; a third lens unit G3 having the positive refractive power; and a last lens unit GE having the negative refractive power. Upon zooming from a wide angle end to a telephoto end, at least the first lens unit G1 and the last lens unit GE move toward the object side so as to increase an air gap between the first lens unit G1 and the second lens unit G2 but to decrease both an air gap between the second lens unit G2 and the third lens unit G3 and an air gap between the third lens unit G3 and the last lens unit GE.

According to yet another aspect of the present invention, there is provided a zoom lens comprising in the following order from the object side: a first lens unit G1 having positive refractive power; a second lens unit G2 having positive refractive power; a third lens unit G3 having the positive or negative refractive power; a fourth lens unit G4 having the positive refractive power; and a last lens unit GE having the negative refractive power. Upon zooming from a wide angle end to a telephoto end, at least the first lens unit G1 and the last lens unit GE move toward the object side so as to increase an air gap between the first lens unit G1 and the second lens unit G2 but to decrease an air gap between the fourth lens unit G4 and the last lens unit GE.

In the zoom lens according to any aspect of the present invention, the first lens unit G1 includes a positive cemented lens L1 constituted by a positive lens element L11 and a negative lens element L12, with a concave side of a cemented surface facing the object side. The zoom lens satisfies the following condition:

$$0.7 < f1/(fw \cdot ft)^{1/2} < 1.4$$

where f1 is the focal length of the first lens unit G1, fw is the focal length of the entire lens system at the wide angle end, and ft is the focal length of the entire lens system at the telephoto end.

According to a preferable mode of the present invention, the zoom lens satisfies the following conditions:

$$0.08 < fw \cdot (N1n - N1p)/|r1m| < 0.5$$

$$35 < (v1p - v1n)$$

where fw is the focal length of the entire lens system at the wide angle end, N1p is the refractive index of the positive lens element L11 in the first lens unit G1 with respect to the d-line, N1n is the refractive index of the negative lens element L12 in the first lens unit G1 with respect to the d-line, v1p is the Abbe number of the positive lens element L11 in the first lens unit G1 with respect to the d-line, v1n is the Abbe number of the negative lens element L12 in the first lens unit G1 with respect to the d-line, and r1m is the radius of curvature of the cemented surface in the first lens unit G1.

The zoom lens according to the present invention is constructed of, sequentially from the object side, the first lens unit G1 having the positive refractive power, an intermediate lens unit GA constituted by at least one lens unit and always having positive synthetic refractive power during zooming and the last lens unit GE having the negative refractive power.

Then, upon zooming from the wide angle end to the telephoto end, at least the first lens unit G1 and the last lens unit GE move toward the objects side so as to increase the air gap between the first lens unit G1 and the closest-to-object surface of the intermediate lens unit GA but to decrease the air gap between the closest-to-image surface of the intermediate lens unit GA and the last lens unit GE.

Based on the above construction, it is possible to attain the zoom lens which is small both in size and in the number of its constructive lens elements but capable of increasing a zooming ratio.

Particularly, according to the present invention, the zoom ratio is increased with a small number of lens elements. For this purpose, the first lens unit G1 located closest to the object side includes the cemented lens constituted by the positive lens element L11 and the negative lens element L12, with the concave side of the cemented surface facing the object side, whereby a negative spherical aberration caused in the first lens unit G1 is well corrected.

As explained above, in the zoom lens with no restriction in terms of the back-focal distance, an effective layout in reducing the entire lens length is to dispose the negative lens unit closest to the image surface. Hence, according to the present invention also, the last lens unit GE disposed closest to the image surface has the negative refractive power.

Then, for attaining a much wider angle, the back-focal distance at the wide angle end is decreased to some extent, and a height of an off-axis light beam passing through the last lens unit GE is spaced away from the optical axis. With this arrangement, an on-axis light beam and the off-axis light beam are independently compensated.

Moreover, the reduction in the entire lens length at the wide angle end makes it possible to decrease an effective aperture of the closest-to-object lens surface by making the height of the off-axis light beam traveling through the first lens unit approximate to the optical axis. Contrastingly, the back-focal distance at the telephoto end is increased, thereby making the height of the off-axis light beams passing through the last lens unit GE more approximate to the optical axis than at the wide angle end. As a result, when the zooming is effected, there increases a difference in the height of the off-axis light beam traveling through the last lens unit GE. Thus, a fluctuation in an off-axis aberration occurred in the last lens unit GE when zooming is performed is well restrained.

The intermediate lens unit GA disposed adjacent to the first lens unit G1 on the image side includes the negative lens element L21 with its strong concave surface toward the object side on the closest-to-object side. Then, at the wide angle end, the negative lens unit (synthetic lens unit of the first lens unit with the second lens unit) is disposed closer to the object in the lens system by narrowing a spacing between the first lens unit G1 and the negative lens element L21, whereby a positive distortion is well corrected. A sufficient back-focal distance is thus obtained. Contrastingly, at the telephoto end, the diverging action is weakened by widening the air gap between the This leads to the reduction in the entire lens length.

The respective conditional expressions of the present invention will hereinafter be explained.

The zoom lens according to the present invention, in addition to the above construction, satisfies the following conditional expression (1):

$$0.7 < f1/(fw \cdot ft)^{1/2} < 1.4 \tag{1}$$

where f1: the focal length of the first lens unit G1, fw: the focal length of the entire lens system at the wide angle end, and ft: the focal length of the entire lens system at the telephoto end.

The conditional expression (1) prescribes a proper range of the focal length f1 of the first lens unit G1 with respect to the focal length fw at the wide angle end and the focal length ft at the telephoto end.

If above an upper limit value of the conditional expression (1), the focal length f1 of the first lens unit G1 increases to the positive. For this reason, the converging action is weakened, resulting in an increase in the entire lens length at the telephoto end.

Whereas if under a lower limit value of the conditional expression (1), the focal length f1 of the first lens unit G1 decreases to the positive, and the height of the off-axis light beam passing through the first lens unit G1 is spaced away from the optical axis. Consequently, the effective aperture of the closest-to-object lens surface increases. It follows that the fluctuation in the comma caused more with a larger view angle can not be restrained.

For obtaining a much better imaging performance, it is desirable that the following conditional expressions (2) and (3) be satisfied:

$$0.08 < fw \cdot (N1n - N1p)/|r1m| < 0.5 \quad (2)$$

$$35 < (v1p - v1n) \quad (3)$$

where

N1p: the refractive index of the positive lens element L11 in the first lens unit G1 with respect to the d-line, N1n: the refractive index of the negative lens element L12 in the first lens unit G1 with respect to the d-line, r1m: the radius of curvature of the cemented surface in the first lens unit G1, v1p: the Abbe number of the positive lens element L11 in the first lens unit G1 with respect to the d-line, and v1n: the Abbe number of the negative lens element L12 in the first lens unit G1 with respect to the d-line.

The conditional expression (2) prescribes the refractive power of the cemented surface in the first lens unit G1.

If above an upper limit value of the conditional expression (2), the refractive power of the cemented surface in the first lens unit G1 becomes too large, resulting in an occurrence of a positive high-order spherical aberration. For this reason, the first lens unit G1 can not be used bright. In the case of increasing the zoom ratio, the positive high-order spherical aberration increases especially at the telephoto end.

Whereas if under a lower limit value of the conditional expression (2), the refractive power of the cemented surface in the first lens unit G1 becomes too small to the negative. It would be therefore difficult to correct the negative spherical aberration produced in the first lens unit G1.

The conditional expression (3) prescribes a difference in the Abbe number between the positive lens element L11 and the negative lens element L12 that constitute the positive cemented lens of the first lens unit G1.

If under a lower limit of the conditional expression (3), it is likely to be difficult to take a balance between a correction of an on-axis chromatic aberration and a correction of the negative spherical aberration that are caused in the first lens unit G1.

For obtaining a much better imaging performance, the lens unit adjacent to the first lens unit G1 on the image side includes the negative lens element L12 with its concave surface toward the object side on the closest-to-object side. It is desirable that the following conditional expressions (4) and (5) be satisfied:

$$0.7 < fw \cdot (N2n - 1)/|r21| < 2.0 \quad (4)$$

$$43 < v2n \quad (5)$$

where r21: the radius of curvature of an object-side surface of the negative lens element L21, N2n: the refractive index of the negative lens element L21 with respect to the d-line, and v2n: the Abbe number of the negative lens element L21 with respect to the d-line.

The conditional expression (4) prescribes the refractive power of the closest-to-object surface of the lens unit adjacent to the first lens unit G1.

If above an upper limit value of the conditional expression (4), a sufficient back-focal distance can be obtained at the wide angle end. There is, however, decreased a difference in the height between the on-axis light beam and the off-axis light beam that are incident on the closest-to-object surface of the lens unit adjacent to the first lens unit G1. It would be therefore difficult to restrain the fluctuation in the coma due to the view angle.

Whereas if under a lower limit value of the conditional expression (4), the sufficient back-focal distance can not be obtained at the wide angle end. It follows that the effective aperture of the closest-to-image lens surface increases because of the height of the off-axis light beam passing through the last lens unit GE being spaced away from the optical axis.

The conditional expression (5) prescribes the Abbe number of the negative lens element L21, disposed closest to the object side, of the lens unit adjacent to the first lens unit G1.

If under a lower limit value of the conditional expression (5), the chromatic aberration would be over-corrected off the axis than on the axis.

Further, for attaining the down-sizing and increasing the zoom ratio, the last lens unit GE includes the positive lens element with its concave surface toward the object side and the negative lens element with its concave surface toward the object side. It is desirable that the following conditional expressions (6) and (7) be satisfied:

$$0.35 < |fe|/fw < 0.85 \quad (6)$$

$$0.4 < \Delta Bf/(ft - fw) < 0.85 \quad (7)$$

where fe: the focal length of the last lens unit GE, and $\Delta$Bf: the moving quantity of the last lens unit GE upon zooming from the wide angle end to the telephoto end.

The conditional expression (6) prescribes the focal length of the last lens unit GE.

If above an upper limit of the conditional expression (6), the diverging action of the last lens unit GE is weakened, and, hence, the height of the off-axis light beam passing through the last lens unit GE is too spaced away from the optical axis at the wide angle end, resulting in an augment in the effective aperture of the closest-to-image lens surface.

Whereas if under a lower limit value of the conditional expression (6), the positive spherical aberration produced in the last lens unit GE is under-corrected, and it follows that there increases the fluctuation in the spherical aberration upon zooming from the wide angle end to the telephoto end.

Further, the height of the off-axis light beam traveling through the last lens unit GE approximates the optical axis at the wide angle end, and, therefore, it would be difficult to well restrain the fluctuation in the off-axis aberration due to the view angle.

The conditional expression (7) prescribes the moving quantity of the last lens unit GE upon zooming from the wide angle end to the telephoto end and is associated with a rate at which the last lens unit GE takes charge of zooming when effecting the zooming.

If above an upper limit value of the conditional expression (7), the charge-of-zooming rate of the last lens unit GE becomes too large when performing the zooming, it would be difficult to well correct the fluctuation in the off-axis aberration produced in the last lens unit GE when in the zooming.

Whereas if under a lower limit value of the conditional expression (7), the zooming burden on the last lens unit GE is relieved. Nevertheless, the charge-of-zooming rate of the lens unit adjacent to the first lens unit G1 on the image side increases. Particularly, there largely changes an angle of the off-axis light beam incident on this adjacent lens unit when in the zooming. For this reason, it would be difficult to well correct the fluctuation in the off-axis aberration caused in the adjacent lens unit when in the zooming.

According to the present invention, upon zooming from the wide angle end to the telephoto end, the first lens unit G1 and the last lens unit GE move together (interlocking with each other), thereby making it possible to simplify the structure of the lens barrel.

Further, according to the present invention, it is feasible to obtain the higher imaging performance and simplify the configuration by applying the aspherical surface to one of the lens surfaces.

Moreover, one or a plurality of lens units are properly shifted in the direction substantially orthogonal to the optical axis, thus correcting the fluctuation in the image position due to a shake or the like. A so-called vibration-reduction effect can be also acquired.

Additionally, when focusing, a preferable imaging performance can be also obtained with respect to the objects ranging from a long range to a short range by use of linear focus.

BRIEF DESCRIPTION OF THE DRAWINGS

Other objects and advantages of the present invention will become apparent during the following discussion in conjunction with the accompanying drawings, in which:

FIGS. 5A to 5D are diagrams showing the various aberrations at the telephoto end in the embodiment 1;

FIGS. 13A to 13D are diagrams showing various aberrations at the wide angle end in the embodiment 3;

FIGS. 18A to 18D are diagrams showing various aberrations at the wide angle end in the embodiment 4;

DETAILED DESCRIPTION OF THE PREFERRED EMBODIMENTS

The present invention will hereinafter be discussed by way of embodiments with reference to the accompanying drawings.

[Embodiment 1]

Figure 1:
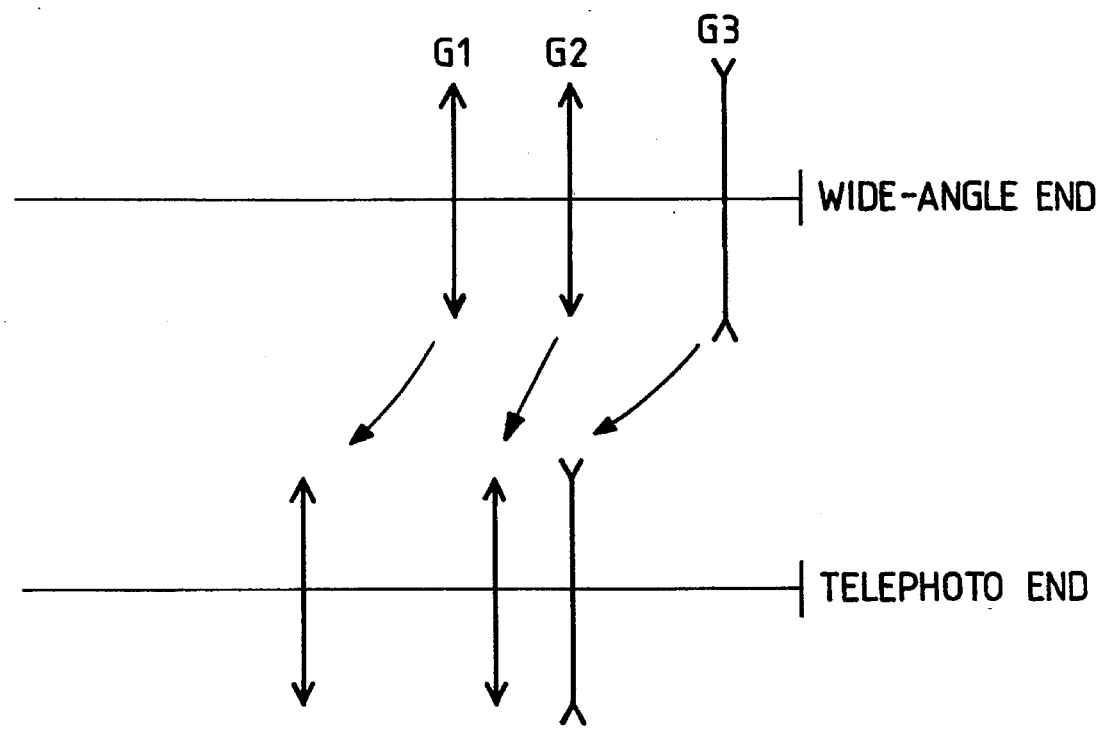
FIG. 1 is a diagram showing a distribution of refractive power of a zoom lens and how each lens unit moves upon zooming from a wide angle end to a telephoto end in accordance with a first embodiment of the present invention.

FIG. 1 is a diagram illustrating a distribution of refractive power of a zoom lens and how respective lens units move upon zooming from a wide angle end to a telephoto end in a first embodiment of the present invention. In FIGS. 1, 6, 11 and 16, the sign ┃ represents a positive lens unit while the sign ┋ represents a negative lens unit.

As shown in FIG. 1, the zoom lens in the first embodiment is constructed of, sequentially from an object side, a first lens unit G1 having positive refractive power, a second lens unit G2 having the positive refractive power and a third lens unit G3 having negative refractive power. Then, upon zooming from the wide angle end to the telephoto end, the respective lens units move along loci indicated by arrows in the Figure so as to increase an air gap between the first lens unit G1 and the second lens unit G2 but to decrease an air gap between the second lens unit G2 and the third lens unit G3.

Figure 2:
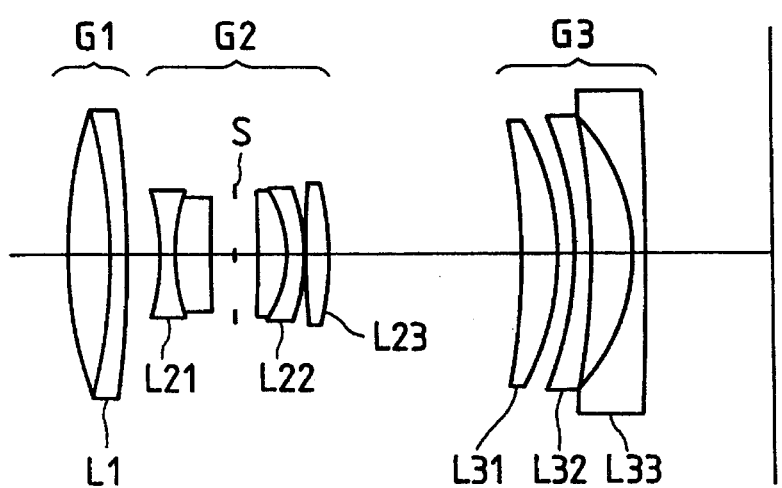
FIG. 2 is a view illustrating a lens layout of the zoom lens in the first embodiment of this invention.
Figure 3A:
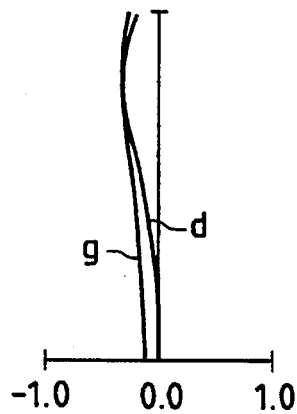
FIGS. 3A to 3D are diagrams showing various aberrations at the wide angle end in the embodiment 1.
Figure 3B:
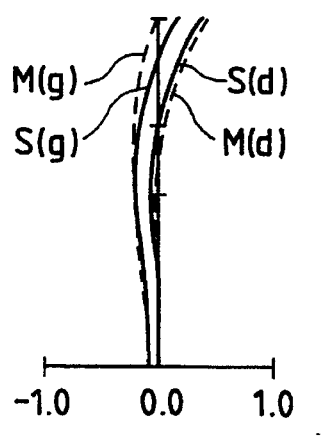
Figure 3C:
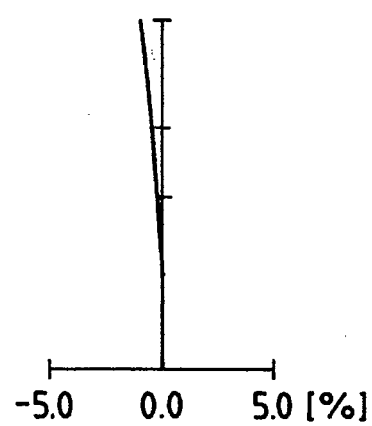
Figure 3D:
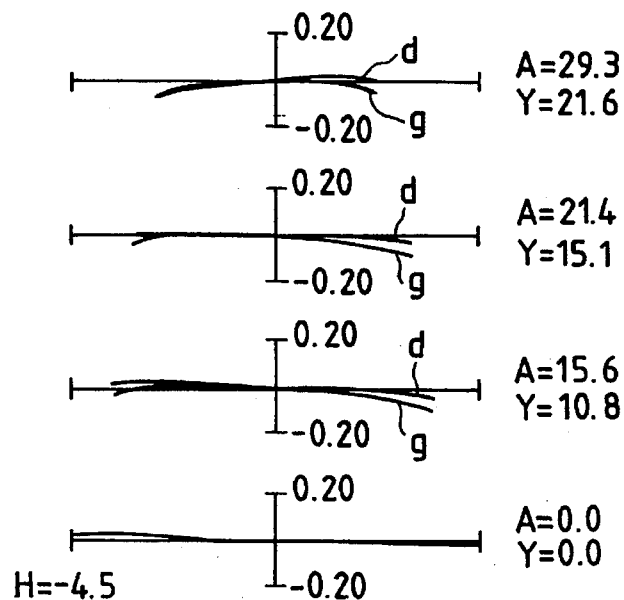
Figure 4A:
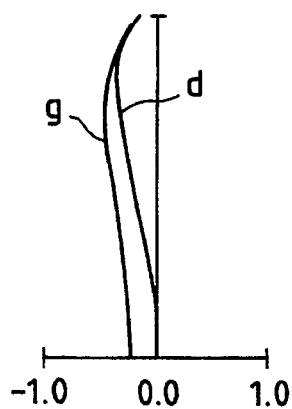
FIGS. 4A to 4D are diagrams showing the various aberrations in an intermediate focal length state in the embodiment 1.
Figure 4B:
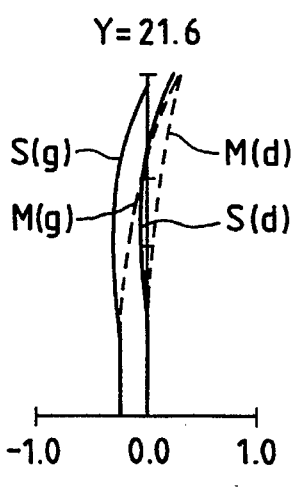
Figure 4C:
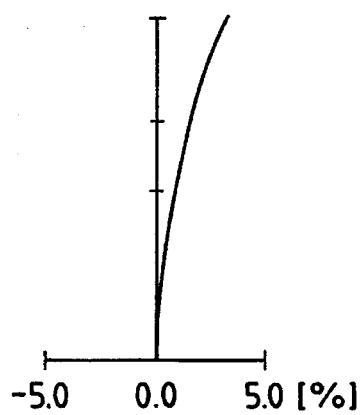
Figure 4D:
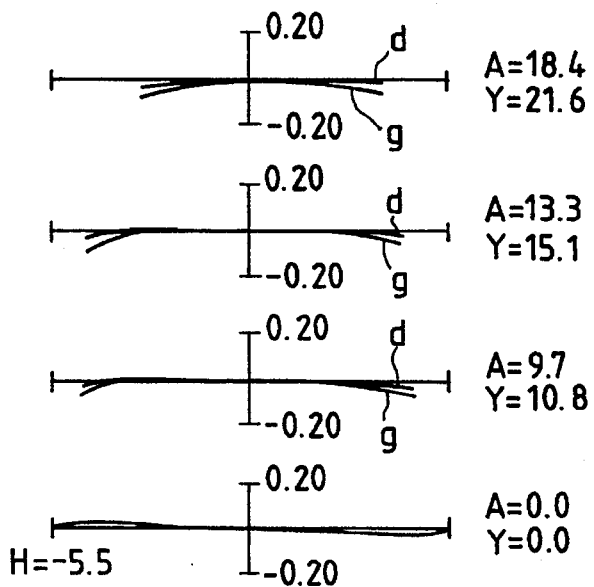

FIG. 2 is a view illustrating a lens layout of the zoom lens in accordance with the first embodiment of the present invention.

The zoom lens in FIG. 2 is constructed of, sequentially from the object side, the first lens unit G1 including a positive cemented lens L1 constituted by a biconvex lens and a negative meniscus lens with its concave surface toward the object side, the second lens unit G2 including a cemented lens L21 constituted by a biconvex lens and a positive meniscus lens with its convex surface toward the object side, a cemented lens L22 constituted by a biconvex lens and a negative meniscus lens with its concave surface toward the object side and a biconvex lens L23 and the third lens unit G3 including a positive meniscus lens L31 with its concave surface toward the object side, a negative meniscus lens L32 with its concave surface toward the object side and a negative meniscus lens L33 with its concave surface toward the object side.

FIG. 2 illustrates a positional relationship between the individual lens units at the wide angle end, wherein the lens units move on an optical axis along the zoom loci indicated by the arrows in FIG. 1 upon zooming to the telephoto end.

Further, a stop S is disposed in the second lens unit G2 but moves together with the second lens unit G2 upon zooming from the wide angle end to the telephoto end.

The following Table 1 shows values of data in the embodiment 1. In Table 1, f represents the focal length, FN designates the F-number, 2ω denotes the view angle, and Bf represents the back-focal distance. Further, the surface number indicates the order of lens surfaces from the object side. The refractive index and the Abbe number respectively show values with respect to the d-line (λ=587.6 nm).

TABLE 1 f = 38.8–62.8–98.0
FN = 4.3–5.7–7.6
2ω = 58.6–36.8–24.2°

| Surface Number | Radius of Curvature | Surface Interval | Refractive Index | Abbe Number |
|---|---|---|---|---|
| 1 | 39.1644 | 3.516 | 1.51860 | 69.98 |
| 2 | −47.8430 | 1.381 | 1.86074 | 23.01 |
| 3 | −84.1902 | (d3 = variable) | | |
| 4 | −19.1336 | 1.256 | 1.74810 | 52.30 |
| 5 | 16.6081 | 3.077 | 1.86074 | 23.01 |
| 6 | 68.6075 | 1.884 | | |
| 7 | ∞ | 1.884 | | (stop) |
| 8 | 213.0947 | 2.763 | 1.51680 | 64.10 |
| 9 | −8.8659 | 1.256 | 1.80518 | 25.35 |
| 10 | −16.2530 | 0.126 | | |
| 11 | 100.1872 | 1.884 | 1.62041 | 60.14 |
| 12 | −23.1243 | (d12 = variable) | | |
| 13 | −55.4179 | 2.888 | 1.80518 | 25.35 |
| 14 | −23.1413 | 1.381 | | |
| 15 | −33.4423 | 1.381 | 1.84042 | 43.35 |
| 16 | −77.4639 | 3.516 | | |
| 17 | −16.8638 | 1.507 | 1.77279 | 49.45 |
| 18 | −188.6525 | (Bf) | | |

(Variable Interval in Zooming)

| f | 38.7909 | 62.7910 | 97.9570 |
|---|---|---|---|
| d3 | 2.7697 | 11.4454 | 17.8180 |
| d12 | 16.3041 | 7.6284 | 1.2559 |
| Bf | 10.5780 | 27.9794 | 51.6296 |

(Condition Corresponding Value)

(1) f1/(fw · ft)$^{1/2}$ = 1.003
(2) fw · (N1n − N1p)/|r1m| = 0.277
(3) (v1p − v1n) = 46.97
(4) fw · (N2n − 1)/|r21| = 1.517

TABLE 1-continued f = 38.8–62.8–98.0
FN = 4.3–5.7–7.6
2ω = 58.6–36.8–24.2°

| Surface Number | Radius of Curvature | Surface Interval | Refractive Index | Abbe Number |
|---|---|---|---|---|
| (5) v2n | | | = 52.30 | |
| (6) |fe|/fw | | | = 0.768 | |
| (7) ΔBf/(ft − fw) | | | = 0.694 | |

FIGS. 3A to 3D, FIGS. 4A to 4D and FIGS. 5A to 5D are diagrams showing various aberrations respectively at the wide angle end, an intermediate focal length state and at the telephoto end in accordance with the embodiment 1.

In each of the aberration diagrams, FN represents the F-number, H designates the height of the incident light, Y denotes the image height, A designates the incident angle of the principal ray, d represents the d-line (λ=587.6 nm), and g denotes the g-line (λ=435.8 nm).

Further, in the aberration diagram showing an astigmatism, the solid line indicates the sagittal image surface S, while the broken line indicates the meridional image surface M. More specifically, S(d) and S(g) represent the sagittal image surface with respect to the d- and g-lines, respectively. The symbols M(d) and M(g) designate the meridional image surfaces with respect to the d- and g-lines, respectively.

As obvious from the individual aberration diagrams, in this embodiment, the variety of aberrations are well corrected. [Embodiment 2]

Figure 6:
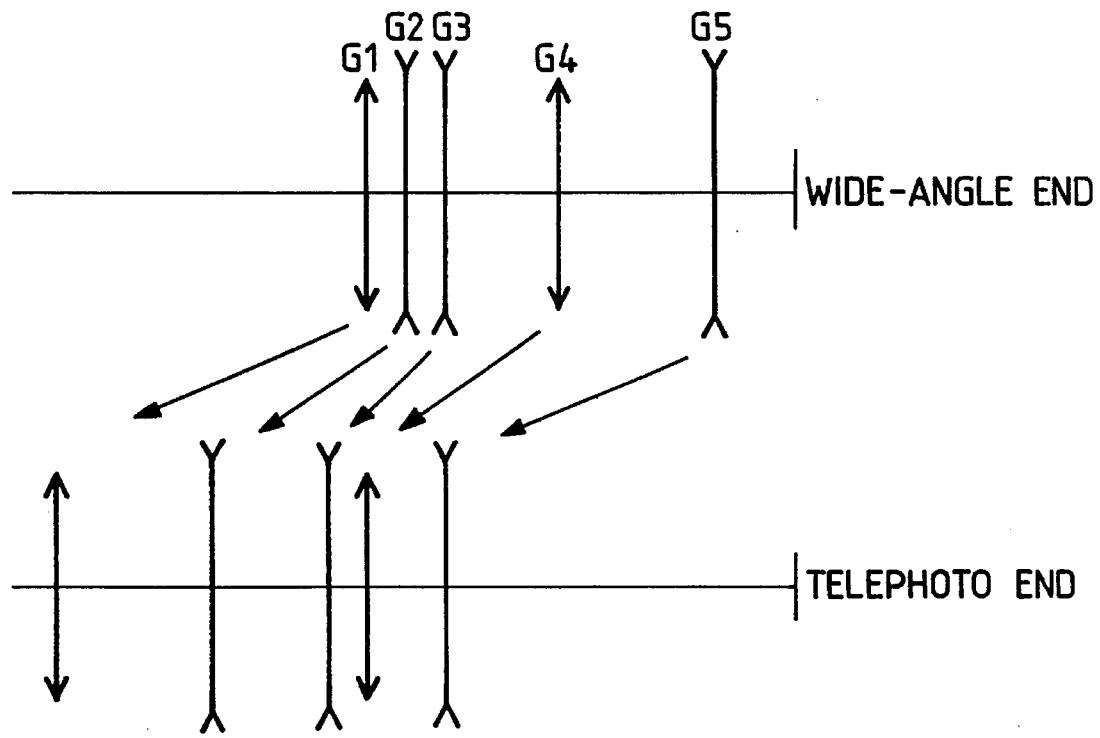
FIG. 6 is a diagram showing a distribution of refractive power of a zoom lens and how each lens unit moves upon zooming from the wide angle end to the telephoto end in accordance with a second embodiment of the present invention.

FIG. 6 is a diagram illustrating a distribution of refractive power of a zoom lens and how respective lens units move upon zooming from a wide angle end to a telephoto end in a second embodiment of the present invention.

As shown in FIG. 6, the zoom lens in the second embodiment is constructed of, sequentially from the object side, a first lens unit G1 having the positive refractive power, a second lens unit G2 having the negative refractive power, a third lens unit G3 having the negative refractive power, a fourth lens unit G4 having the positive refractive power and a fifth lens unit G5 having the negative refractive power. Then, upon zooming from the wide angle end to the telephoto end, the respective lens units move along loci indicated by the arrows in the Figure so as to increase both an air gap between the first lens unit G1 and the second lens unit G2 and an air gap between the second lens unit G2 and the third lens unit G3 but to decrease both an air gap between the third lens unit G3 and the fourth lens unit G4 and an air gap between the fourth lens unit G4 and the fifth lens unit G5.

Figure 7:
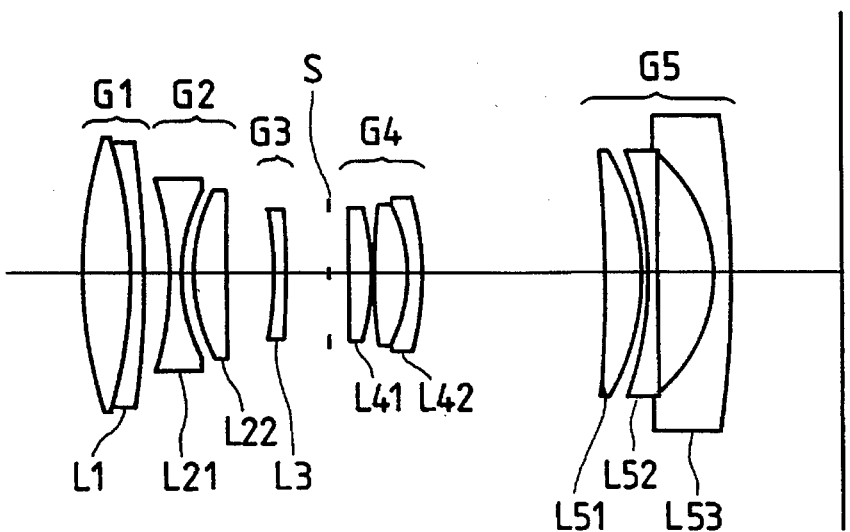
FIG. 7 is a view illustrating a lens layout of the zoom lens in the second embodiment of this invention.
Figure 8A:
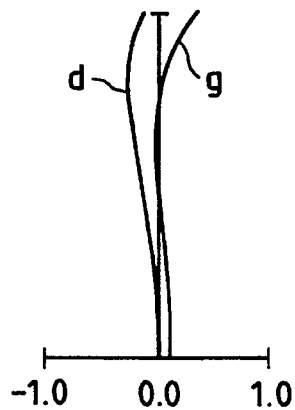
FIGS. 8A to 8D are diagrams showing various aberrations at the wide angle end in the embodiment 2.
Figure 8B:
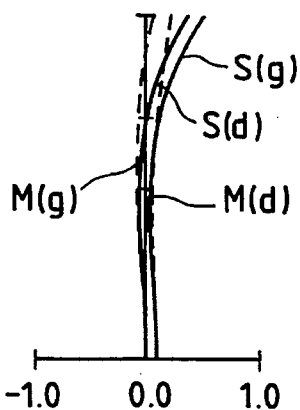
Figure 8C:
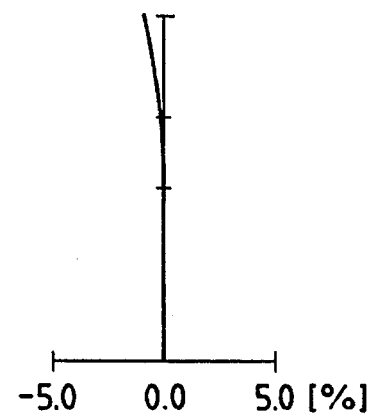
Figure 8D:
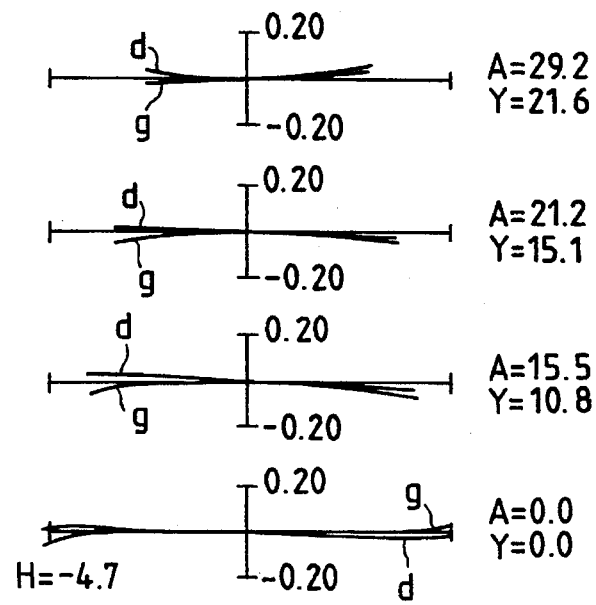
Figure 9A:
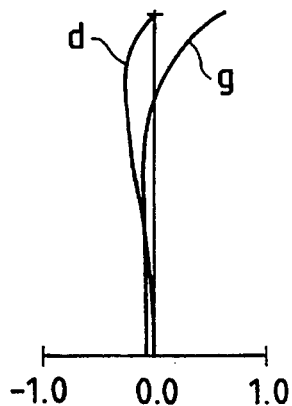
FIGS. 9A to 9D are diagrams showing the various aberrations in an intermediate focal length state in the embodiment 2.
Figure 9B:
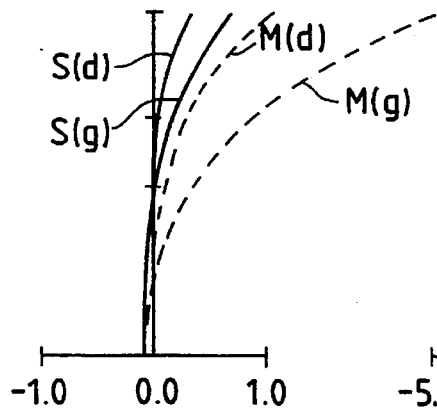
Figure 9C:
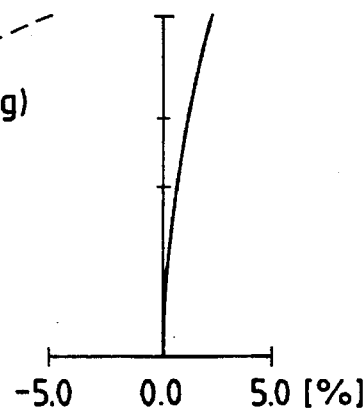
Figure 9D:
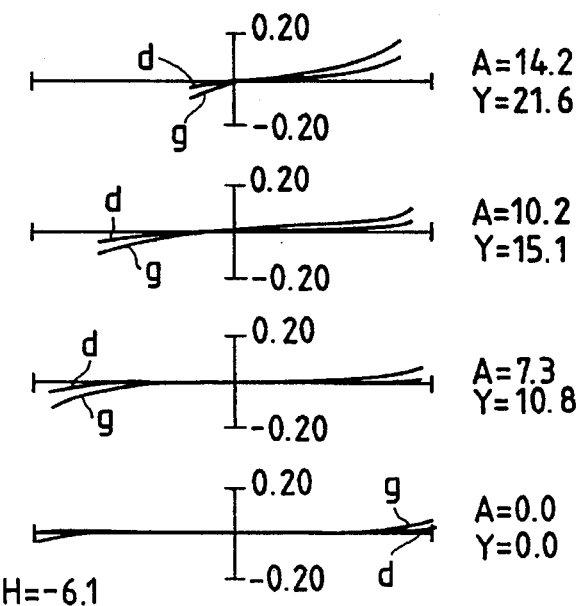
Figure 10A:
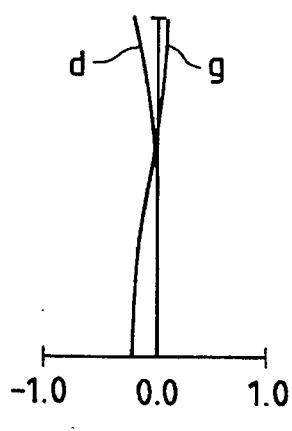
FIGS. 10A to 10D are diagrams showing the various aberrations at the telephoto end in the embodiment 2.
Figure 10B:
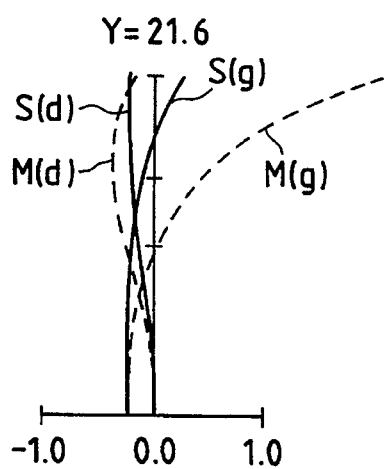
Figure 10C:
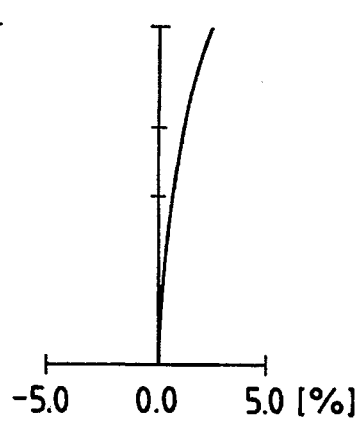
Figure 10D:
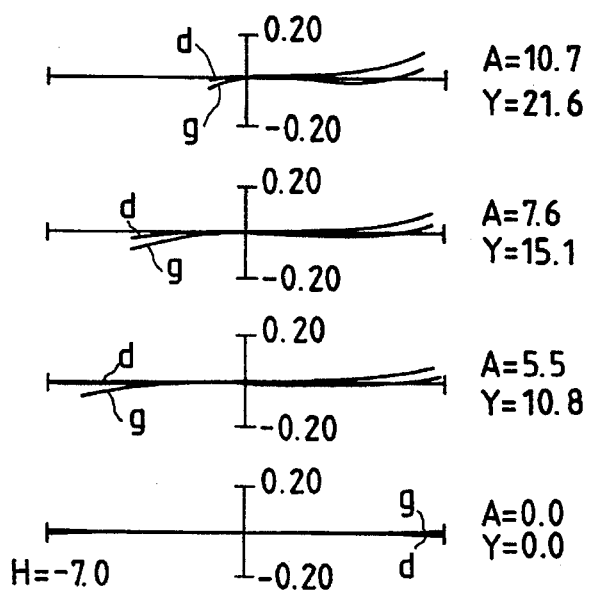

FIG. 7 is a view illustrating a lens layout of the zoom lens in accordance with the second embodiment of the present invention.

The zoom lens in FIG. 7 is constructed of, sequentially from the object side, the first lens unit G1 including a positive cemented lens L1 constituted by a biconvex lens and a negative meniscus lens with its concave surface toward the object side, the second lens unit G2 including a biconvex lens L21 and a positive meniscus lens L22 with its convex surface toward the object side, a cemented lens L22 constituted by a biconvex lens and a negative meniscus lens with its concave surface toward the object side and a biconvex lens L23, the third lens unit G3 including a negative meniscus lens L3 with its concave surface toward the object side, the fourth lens unit G4 including a biconvex lens L41 and a cemented lens L42 constituted by a biconvex lens and a negative meniscus lens with its concave surface toward the object side and the fifth lens unit G5 including a positive meniscus lens L51 with its concave surface toward the object side, a negative meniscus lens L52 with its concave surface toward the object side and a negative meniscus lens L53 with its concave surface toward the object side.

FIG. 7 illustrates a positional relationship between the individual lens units at the wide angle end, wherein the lens units move on the optical axis along the zoom loci indicated by the arrows in FIG. 6 upon zooming to the telephoto end.

Further, the stop S is disposed between the third lens unit G3 and the fourth lens unit G4 but moves together with the fourth lens unit G4 upon zooming from the wide angle end to the telephoto end.

The following Table 2 shows values of data in the embodiment 2. In Table 2, f represents the focal length, FN designates the F-number, 2ω denotes the view angle, and Bf represents the back-focal distance. Further, the surface number indicates the order of lens surfaces from the object side. The refractive index and the Abbe number respectively show values with respect to the d-line ($\lambda$=587.6 nm).

TABLE 2 f = 39.0–83.5–112.0
FN = 4.2–6.8–8.0
2ω = 58.4–28.4–21.4°

| Surface Number | Radius of Curvature | Surface Interval | Refractive Index | Abbe Number |
| --- | --- | --- | --- | --- |
| 1 | 35.6272 | 4.000 | 1.51860 | 69.98 |
| 2 | −43.3114 | 1.200 | 1.86074 | 23.01 |
| 3 | −79.8455 | (d3 = variable) | | |
| 4 | −33.0774 | 1.000 | 1.77279 | 49.45 |
| 5 | 16.5509 | 1.000 | | |
| 6 | 16.1209 | 2.600 | 1.75520 | 27.61 |
| 7 | 425.6180 | (d7 = variable) | | |
| 8 | −31.2898 | 1.000 | 1.77279 | 49.45 |
| 9 | −94.1417 | (d9 = variable) | | |
| 10 | ∞ | 1.500 | | (stop) |
| 11 | 229.3726 | 1.800 | 1.62041 | 60.14 |
| 12 | −37.7064 | 0.100 | | |
| 13 | 29.2488 | 3.300 | 1.51860 | 69.98 |
| 14 | −11.2452 | 1.000 | 1.80518 | 25.35 |
| 15 | −20.9440 | (d15 = variable) | | |
| 16 | −99.2788 | 3.000 | 1.80518 | 25.35 |
| 17 | −21.1513 | 0.600 | | |
| 18 | −31.5989 | 1.000 | 1.84042 | 43.35 |
| 19 | −246.0545 | 4.200 | | |
| 20 | −13.5005 | 1.500 | 1.77279 | 49.45 |
| 21 | −95.5859 | (Bf) | | |

(Variable Interval in Zooming)

| | | | |
| --- | --- | --- | --- |
| f | 39.0193 | 83.4643 | 111.9688 |
| d3 | 2.0053 | 11.5430 | 15.3403 |
| d7 | 3.8056 | 5.0756 | 6.3456 |
| d9 | 3.6014 | 2.3314 | 1.0614 |
| d15 | 15.1344 | 4.8474 | 1.7994 |
| Bf | 9.8804 | 52.5974 | 53.3467 |

(Condition Corresponding Value)

(1) f1/(fw · ft)$^{1/2}$ = 0.876
(2) fw · (N1n − N1p)/|r1m| = 0.308
(3) (v1p − v1n) = 46.97
(4) fw · (N2n − 1)/|r21| = 0.912
(5) v2n = 49.45
(6) |fe|/fw = 0.648
(7) ΔBf/(ft − fw) = 0.559

FIGS. 8A to 8D, FIGS. 9A to 9D and FIGS. 10A to 10D are diagrams showing various aberrations respectively at the wide angle end, an intermediate focal length state and at the telephoto end in accordance with the embodiment 2.

In each of the aberration diagrams, FN represents the F-number, H designates the height of the incident light, Y denotes the image height, A designates the incident angle of the principal ray, d represents the d-line ($\lambda$=587.6 nm), and g denotes the g-line ($\lambda$=435.8 nm)

Further, in the aberration diagram showing an astigmatism, the solid line indicates the sagittal image surface S, while the broken line indicates the meridional image surface M. More specifically, S(d) and S(g) represent the sagittal image surface with respect to the d- and g-lines, respectively. The symbols M(d) and M(g) designate the meridional image surfaces with respect to the d- and g-lines, respectively.

As obvious from the individual aberration diagrams, in this embodiment, the variety of aberrations are well corrected. [Embodiment 3]

Figure 11:
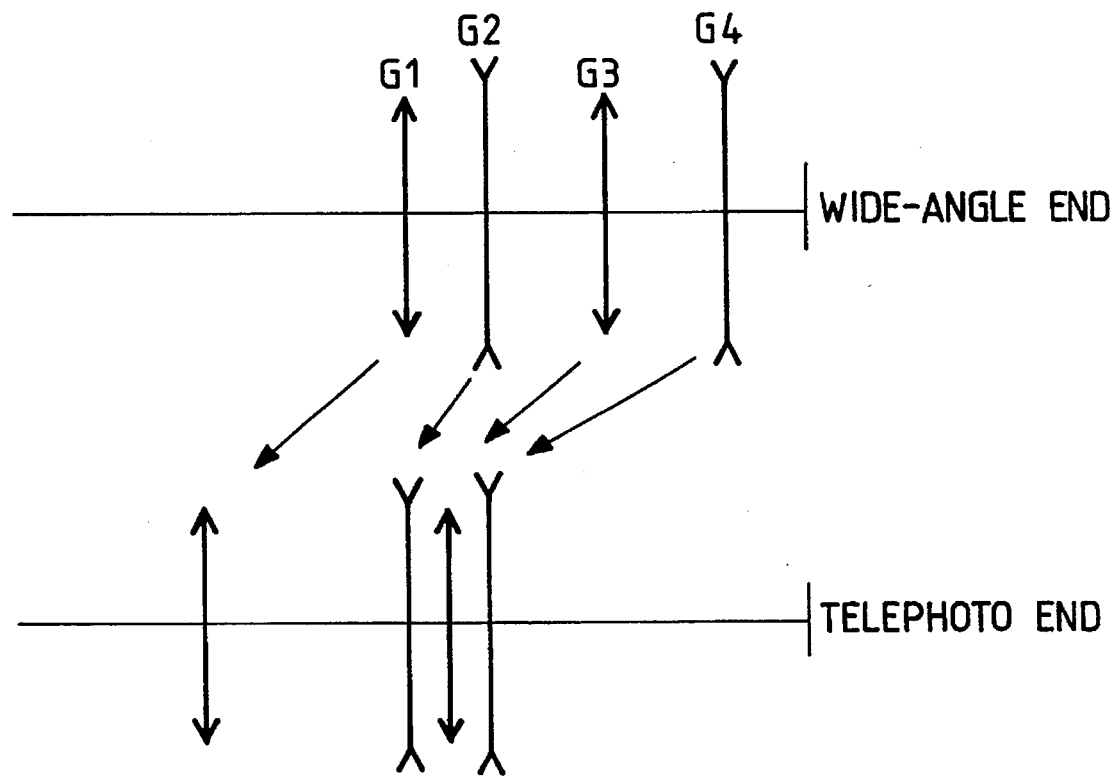
FIG. 11 is a diagram showing a distribution of refractive power of a zoom lens and how each lens unit moves upon zooming from the wide angle end to the telephoto end in accordance with a third embodiment of the present invention.

FIG. 11 is a diagram illustrating a distribution of refractive power of a zoom lens and how respective lens units move upon zooming from a wide angle end to a telephoto end in a third embodiment of the present invention.

As shown in FIG. 11, the zoom lens in the second embodiment is constructed of, sequentially from the object side, a first lens unit G1 having the positive refractive power, a second lens unit G2 having the negative refractive power, a third lens unit G3 having the positive refractive power and a fourth lens unit having the negative refractive power. Then, upon zooming from the wide angle end to the telephoto end, the respective lens units move along loci indicated by the arrows in the Figure so as to increase an air gap between the first lens unit G1 and the second lens unit G2 but to decrease both an air gap between the second lens unit G2 and the third lens unit G3 and an air gap between the third lens unit G3 and the fourth lens unit G4.

Figure 12:
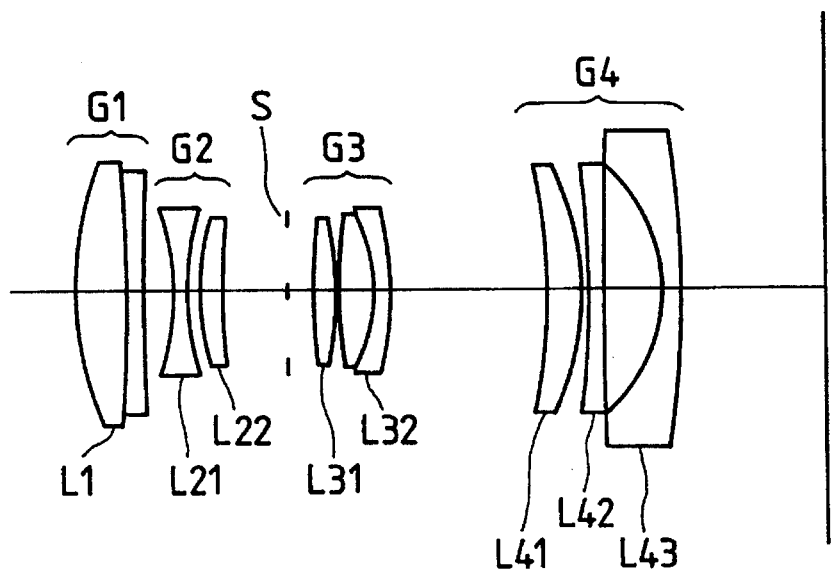
FIG. 12 is a view illustrating a lens layout of the zoom lens in the third embodiment of this invention.
Figure 14A:
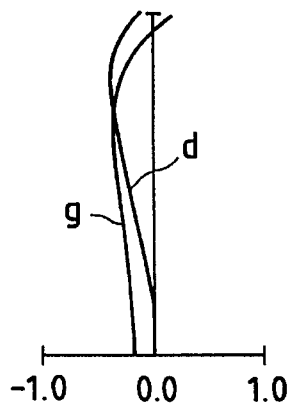
FIGS. 14A to 14D are diagrams showing the various aberrations in an intermediate focal length state in the embodiment 3.
Figure 14B:
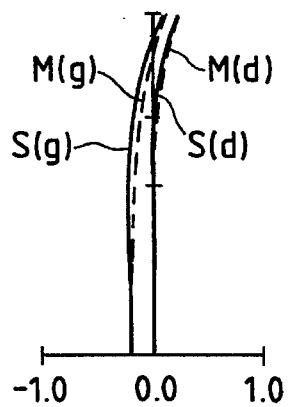
Figure 14C:
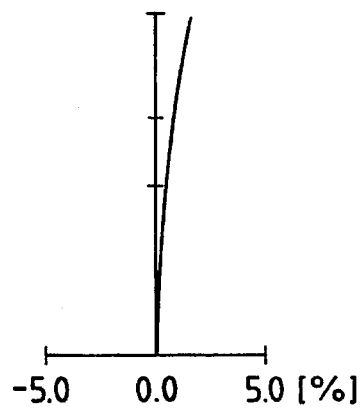
Figure 14D:
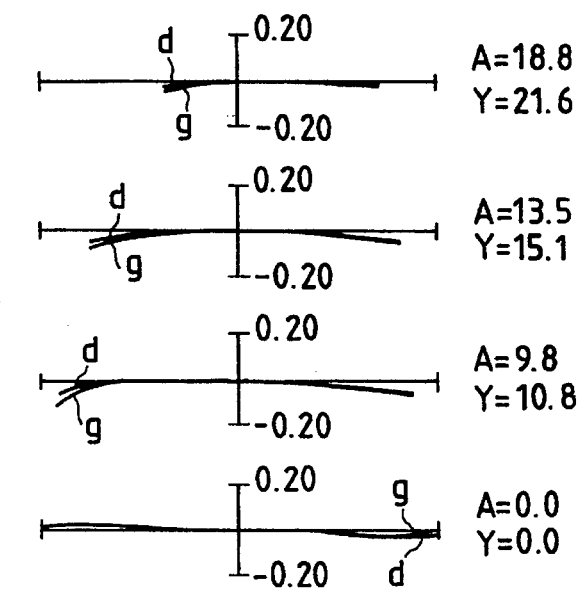
Figure 15A:
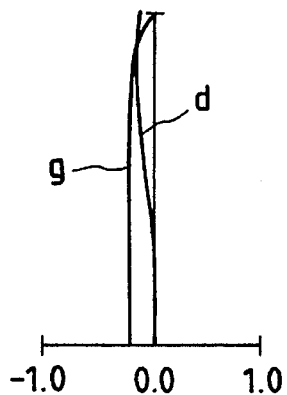
FIGS. 15A to 15D are diagrams showing the various aberrations at the telephoto end in the embodiment 3.
Figure 15B:
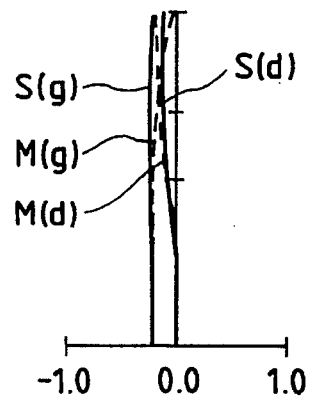
Figure 15C:
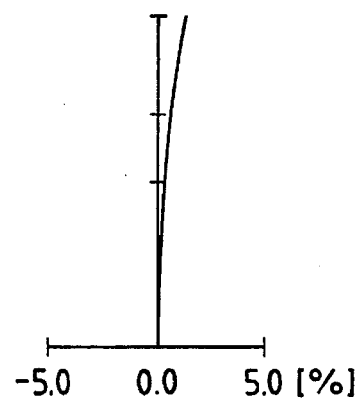
Figure 15D:
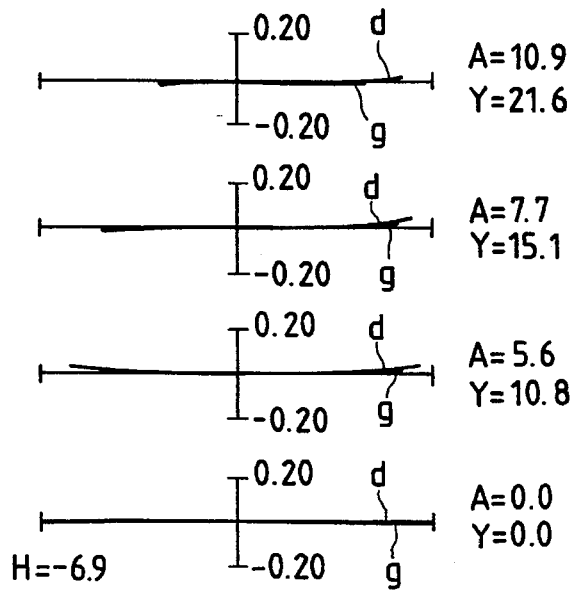

FIG. 12 is a view illustrating a lens layout of the zoom lens in accordance with the third embodiment of the present invention.

The zoom lens in FIG. 12 is constructed of, sequentially from the object side, the first lens unit G1 including a positive cemented lens L1 constituted by a biconvex lens and a negative meniscus lens with its concave surface toward the object side, the second lens unit G2 including a biconvex lens L21 and a positive meniscus lens L22 with its convex surface toward the object side, the third lens unit G3 including a cemented lens L32 constituted by a biconvex lens and a negative meniscus lens with its concave surface toward the object side and the fourth lens unit G4 including a positive meniscus lens L41 with its concave surface toward the object side, a negative meniscus lens L42 with its concave surface toward the object side and a negative meniscus lens L43 with its concave surface toward the object side.

FIG. 12 illustrates a positional relationship between the individual lens units at the wide angle end, wherein the lens units move on the optical axis along the zoom loci indicated by the arrows in FIG. 11 upon zooming to the telephoto end.

Further, the stop S is disposed between the second lens unit G2 and the third lens unit G3 but moves together with the third lens unit G3 upon zooming from the wide angle end to the telephoto end.

The following Table 3 shows values of data in the embodiment 3. In Table 3, f represents the focal length, FN designates the F-number, 2ω denotes the view angle, and Bf represents the back-focal distance. Further, the surface number indicates the order of lens surfaces from the object side. The refractive index and the Abbe number respectively show values with respect to the d-line ($\lambda$=587.6 nm).

TABLE 3 f = 38.8–62.9–110.5 mm
FN = 4.0–5.5–8.0
2ω = 59.0–37.6–21.8

| Surface Number | Radius of Curvature | Surface Interval | Refractive Index | Abbe Number |
|---|---|---|---|---|
| 1 | 30.1982 | 3.893 | 1.51860 | 69.98 |
| 2 | –113.3634 | 1.381 | 1.86074 | 23.01 |
| 3 | 7,506.2080 | (d3 = variable) | | |
| 4 | –23.7196 | 1.256 | 1.74810 | 52.30 |
| 5 | 21.8789 | 1.005 | | |
| 6 | 22.7657 | 1.758 | 1.86074 | 23.01 |
| 7 | 76.8698 | (d7 = variable) | | |
| 8 | ∞ | 1.884 | (stop) | |
| 9 | 44.3102 | 1.884 | 1.51860 | 69.98 |
| 10 | –31.3119 | 0.126 | | |
| 11 | 46.5835 | 3.014 | 1.51680 | 64.10 |
| 12 | –11.7664 | 1.256 | 1.80518 | 25.35 |
| 13 | –21.7079 | (d13 = variable) | | |
| 14 | –48.5717 | 2.888 | 1.80518 | 25.35 |
| 15 | –21.3746 | 0.628 | | |
| 16 | –61.7549 | 1.381 | 1.84042 | 43.35 |
| 17 | –760.9659 | 4.395 | | |
| 18 | –13.1379 | 1.507 | 1.77279 | 49.45 |
| 19 | –88.9699 | (Bf) | | |

(Variable Interval in Zooming)

| f | 38.8146 | 62.4853 | 110.5160 |
|---|---|---|---|
| d3 | 2.1349 | 9.6698 | 17.2047 |
| d7 | 5.0233 | 3.1395 | 1.2558 |
| d13 | 12.5581 | 6.9070 | 1.2558 |
| Bf | 11.7555 | 26.2929 | 53.6373 |

(Condition Corresponding Value)

| (1) f1/(fw · ft)$^{1/2}$ | = 1.077 |
|---|---|
| (2) fw · (N1n – N1p)/\|r1m\| | = 0.117 |
| (3) (v1p – v1n) | = 46.97 |
| (4) fw · (N2n – 1)/\|r21\| | = 1.224 |
| (5) v2n | = 52.30 |
| (6) \|fe\|/fw | = 0.667 |
| (7) ΔBf/(ft – fw) | = 0.584 |

FIGS. 13A to 13D, FIGS. 14A to 14D and FIGS. 15A to 15D are diagrams showing various aberrations respectively at the wide angle end, an intermediate focal length state and at the telephoto end in accordance with the embodiment 3.

In each of the aberration diagrams, FN represents the F-number, H designates the height of the incident light, Y denotes the image height, A designates the incident angle of the principal ray, d represents the d-line (λ=587.6 nm), and g denotes the g-line (λ=435.8 nm).

Further, in the aberration diagram showing an astigmatism, the solid line indicates the sagittal image surface S, while the broken line indicates the meridional image surface M. More specifically, S(d) and S(g) represent the sagittal image surface with respect to the d- and g-lines, respectively. The symbols M(d) and M(g) designate the meridional image surfaces with respect to the d- and g-lines, respectively.

As obvious from the individual aberration diagrams, in this embodiment, the variety of aberrations are well corrected.

[Embodiment 4]

Figure 16:
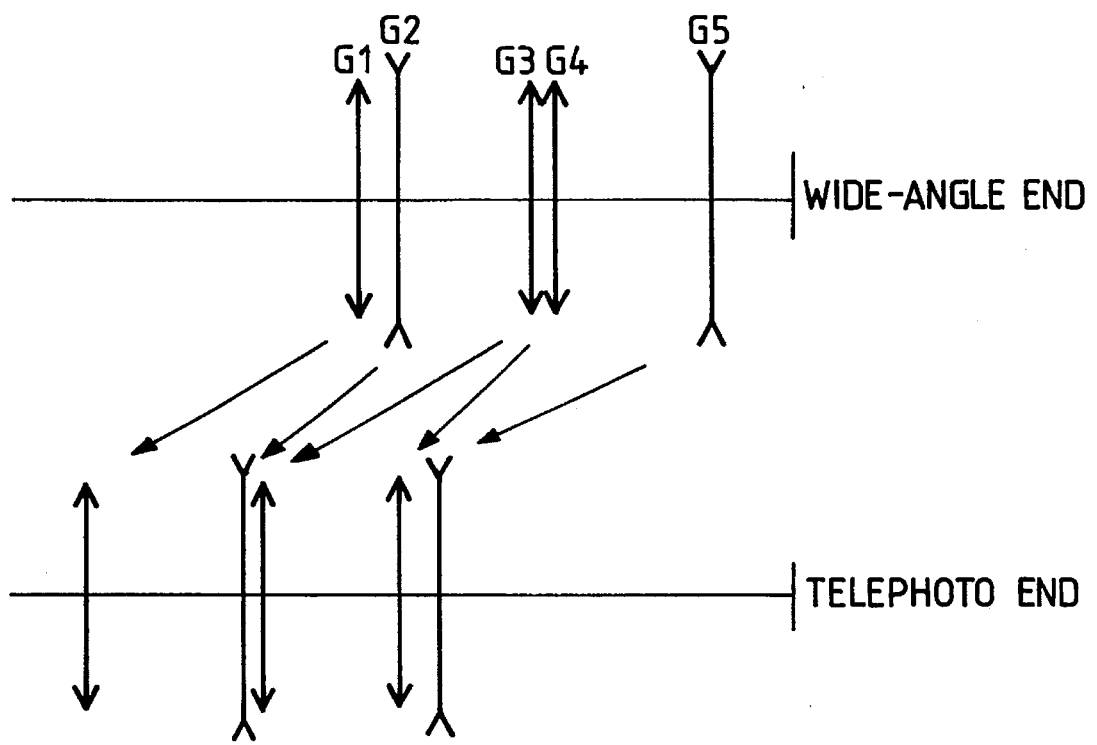
FIG. 16 is a diagram showing a distribution of refractive power of a zoom lens and how each lens unit moves upon zooming from the wide angle end to the telephoto end in accordance with a fourth embodiment of the present invention.

FIG. 16 is a diagram illustrating a distribution of refractive power of a zoom lens and how respective lens units move upon zooming from a wide angle end to a telephoto end in a fourth embodiment of the present invention.

As shown in FIG. 16, the zoom lens in the fourth embodiment is constructed of, sequentially from the object side, a first lens unit G1 having the positive refractive power, a second lens unit G2 having the negative refractive power, a third lens unit G3 having the positive refractive power, a fourth lens unit having the positive refractive power and a fifth lens unit having the negative refractive power. Upon zooming from the wide angle end to the telephoto end, the respective lens units move along loci indicated by the arrows in the Figure so as to increase an air gap between the first lens unit G1 and the second lens unit G2, decrease an air gap between the second lens unit G2 and the third lens unit G3, increase an air gap between the third lens unit G3 and the fourth lens unit G4 and decrease an air gap between the fourth lens unit G4 and the fifth lens unit G5.

Figure 17:
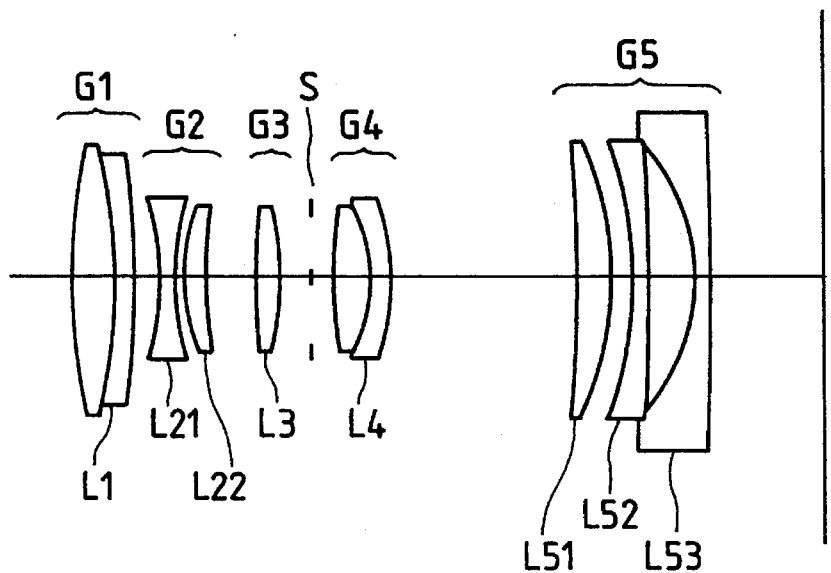
FIG. 17 is a view illustrating a lens layout of the zoom lens in the fourth embodiment of this invention.
Figure 19A:
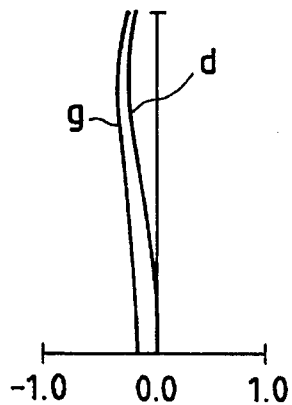
FIGS. 19A to 19D are diagrams showing the various aberrations in an intermediate focal length state in the embodiment 4.
Figure 19B:
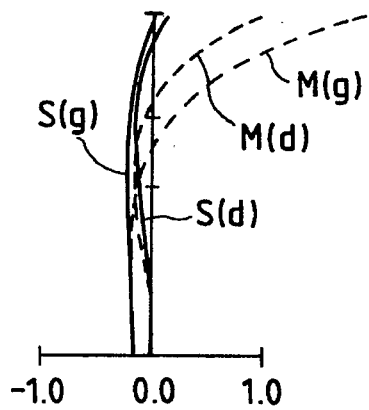
Figure 19C:
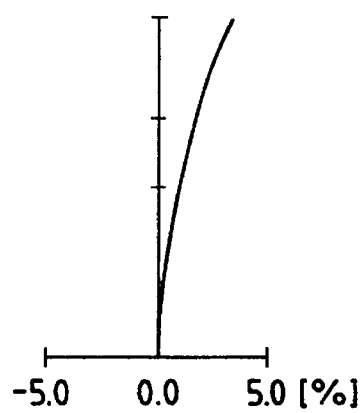
Figure 19D:
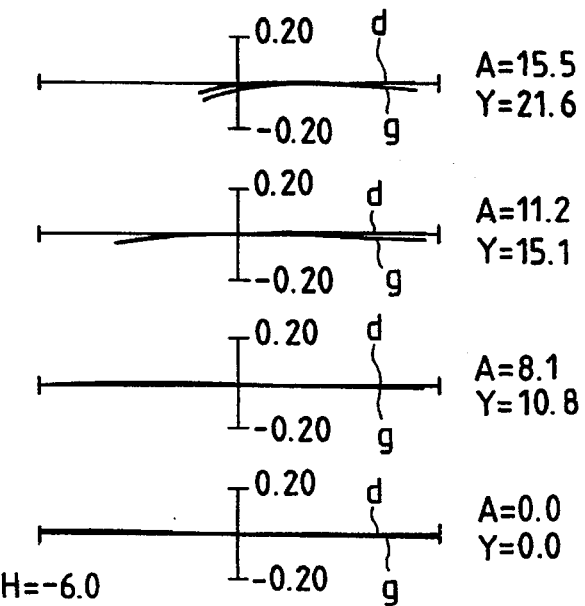
Figure 20A:
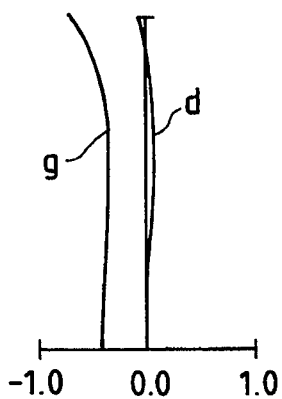
FIGS. 20A to 20D are diagrams showing the various aberrations at the telephoto end in the embodiment 4.
Figure 20B:
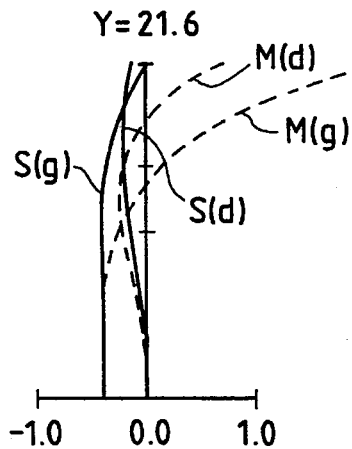
Figure 20C:
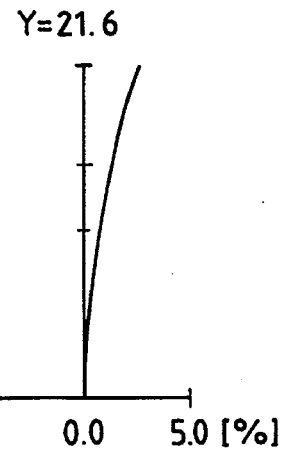
Figure 20D:
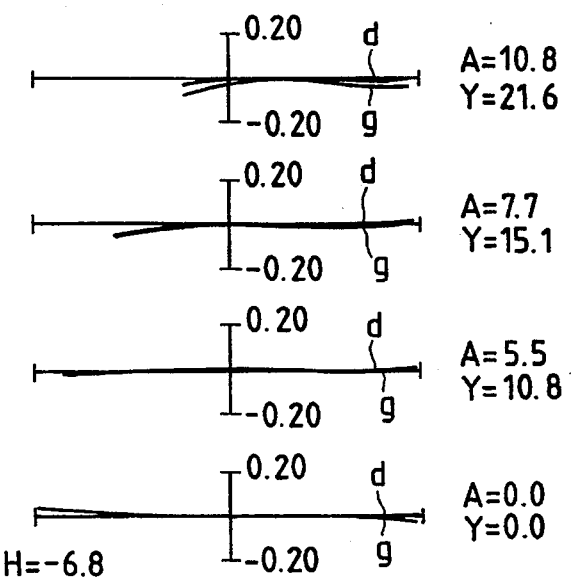

FIG. 17 is a view illustrating a lens layout of the zoom lens in accordance with the fourth embodiment of the present invention.

The zoom lens in FIG. 17 is constructed of, sequentially from the object side, the first lens unit G1 including a positive cemented lens L1 constituted by a biconvex lens and a negative meniscus lens with its concave surface toward the object side, the second lens unit G2 including a biconcave lens L21 and a positive meniscus lens L22 with its convex surface toward the object side, the third lens unit G3 including a biconvex lens L3, the fourth lens unit G4 including a cemented lens L4 constituted by a biconvex lens and a negative meniscus lens with its concave surface toward the object side and the fifth lens unit G5 including a positive meniscus lens L51 with its concave surface toward the object side, a negative meniscus lens L52 with its concave surface toward the object side and a negative meniscus lens L53 with its concave surface toward the object side.

FIG. 17 illustrates a positional relationship between the individual lens units at the wide angle end, wherein the lens units move on the optical axis along the zoom loci indicated by the arrows in FIG. 16 upon zooming to the telephoto end.

Further, the stop S is disposed between the third lens unit G3 and the fourth lens unit G4 but moves together with the fourth lens unit G4 upon zooming from the wide angle end to the telephoto end.

The following Table 4 shows values of data in the embodiment 4. In Table 4, f represents the focal length, FN designates the F-number, 2ω denotes the view angle, and Bf represents the back-focal distance. Further, the surface number indicates the order of lens surfaces from the object side. The refractive index and the Abbe number respectively show values with respect to the d-line (λ=587.6 nm).

TABLE 4 f = 38.8–75.4–110.5 mm
FN = 4.1–6.3–8.2
2ω = 58.6–31.0–21.6

| Surface Number | Radius of Curvature | Surface Interval | Refractive Index | Abbe Number |
|---|---|---|---|---|
| 1 | 45.0525 | 3.893 | 1.51860 | 69.98 |
| 2 | –38.2984 | 1.381 | 1.86074 | 23.01 |
| 3 | –67.7399 | (d3 = variable) | | |
| 4 | –21.1121 | 1.256 | 1.74810 | 52.30 |
| 5 | 18.7929 | 0.879 | | |
| 6 | 18.5014 | 1.884 | 1.86074 | 23.01 |
| 7 | 57.8271 | (d7 = variable) | | |
| 8 | 107.9504 | 1.758 | 1.51860 | 459.98 |
| 9 | –25.8609 | (d9 = variable) | | |
| 10 | ∞ | 1.884 | | (stop) |
| 11 | 40.0922 | 3.265 | 1.51860 | 69.98 |
| 12 | –10.7240 | 1.507 | 1.80518 | 25.35 |
| 13 | –19.5245 | (d13 = variable) | | |
| 14 | –149.4337 | 2.888 | 1.80518 | 25.35 |
| 15 | –26.0698 | 1.633 | | |
| 16 | –32.9870 | 1.381 | 1.84042 | 43.35 |
| 17 | –169.9714 | 3.767 | | |

TABLE 4-continued

| | f = 38.8–75.4–110.5 mm | | | |
| | FN = 4.1–6.3–8.2 | | | |
| | 2ω = 58.6–31.0–21.6 | | | |
| Surface Number | Radius of Curvature | Surface Interval | Refractive Index | Abbe Number |
| --- | --- | --- | --- | --- |
| 18 | −16.6274 | 1.507 | 1.77279 | 49.45 |
| 19 | −294.9844 | (Bf) | | |

| (Variable Interval in Zooming) | | | |
| --- | --- | --- | --- |
| f | 38.8094 | 75.3954 | 110.5159 |
| d3 | 2.0894 | 11.6587 | 16.2726 |
| d7 | 4.0239 | 2.2658 | 1.5123 |
| d9 | 2.7541 | 4.5123 | 5.2657 |
| d13 | 15.3352 | 5.7400 | 1.1521 |
| Bf | 9.5997 | 31.9941 | 52.0738 |

| (Condition Corresponding Value) | |
| --- | --- |
| (1) $f1/(fw \cdot ft)^{1/2}$ | = 1.008 |
| (2) $fw \cdot (N1n - N1p)/|r1m|$ | = 0.349 |
| (3) $(v1p - v1n)$ | = 46.97 |
| (4) $fw \cdot (N2n - 1)/|r21|$ | = 1.375 |
| (5) $v2n$ | = 52.30 |
| (6) $|fe|/fw$ | = 0.728 |
| (7) $\Delta Bf/(ft - fw)$ | = 0.592 |

FIGS. 18A to 18D, FIGS. 19A to 19D and FIGS. 20A to 20D are diagrams showing various aberrations respectively at the wide angle end, an intermediate focal length state and at the telephoto end in accordance with the embodiment 4.

In each of the aberration diagrams, FN represents the F-number, H designates the height of the incident light, Y denotes the image height, A designates the incident angle of the principal ray, d represents the d-line (λ=587.6 nm), and g denotes the g-line (λ=435.8 nm).

Further, in the aberration diagram showing an astigmatism, the solid line indicates the sagittal image surface S, while the broken line indicates the meridional image surface M. More specifically, S(d) and S(g) represent the sagittal image surface with respect to the d- and g-lines, respectively. The symbols M(d) and M(g) designate the meridional image surfaces with respect to the d- and g-lines, respectively.

As obvious from the individual aberration diagrams, in this embodiment, the variety of aberrations are well corrected.

As discussed above, according to the present invention, it is possible to actualize the zoom lens exhibiting an excellent imaging performance while attaining a simplified configuration, a reduction in costs and down-sizing as well.

It is apparent that, in this invention, a wide range of different working modes can be formed based on the invention without deviating from the spirit and scope of the invention. This invention is not restricted by its specific working modes except being limited by the appended claims.

What is claimed is:

1. A zoom lens comprising:
at least three movable lens units including:
a first lens unit disposed closest to an object side and having positive refractive power, said first lens unit including a positive cemented lens having a positive lens element and a negative lens element, a cemented concave surface of the negative lens element facing the object side, and
a last lens unit disposed closest to an image side,
wherein, upon zooming from a wide angle end to a telephoto end, at least said first lens unit and said last lens unit move toward the object side so as to increase an air gap between said first lens unit and a lens unit adjacent to said first lens unit on the image side but to decrease an air gap between said last lens unit and a lens unit adjacent to said last lens unit on the object side,
said zoom lens satisfying the following conditions:

$$0.7 < f1/(fw \cdot ft)^{1/2} < 1.4$$

$$0.08 < fw \cdot (N1n - N1p)/|r1m| < 0.5$$

where f1 is the focal length of said first lens unit, fw is the focal length of the entire lens system at the wide angle end, ft is the focal length of the entire lens system at the telephoto end, N1p is the refractive index of said positive lens element in said first lens unit with respect to the d-line, N1n is the refractive index of said negative lens element in said first lens unit with respect to the d-line, and r1m is the radius of curvature of the cemented concave surface in said first lens unit.

2. A zoom lens according to claim 1, wherein said first lens unit is movable when zooming is effected.

3. A zoom lens according to claim 1, wherein said last lens unit has negative refractive power.

4. A zoom lens according to claim 1, wherein said zoom lens satisfies the following condition:

$$[0.08 < fw \cdot (N1n - N1p)/|r1m| < 0.5]$$

$$35 < (v1p - v1n)$$

where v1p is the Abbe number of said positive lens element in said first lens unit with respect to the d-line and v1n is the Abbe number of said negative lens element in said first lens unit with respect to the d-line.

5. A zoom lens according to claim 1, wherein said lens unit adjacent to said first lens unit on the image side includes, on the closest-to-object side, a negative lens element with its concave surface toward the object side and satisfies the following conditions:

$$0.7 < fw \cdot (N2n - 1)/|r21| < 2.0$$

$$43 < v2n$$

where r21 is the radius of curvature of an object-side surface of said negative lens element of said lens unit adjacent to said first lens unit, N2n is the refractive index of said negative lens element of said lens unit adjacent to said first lens unit with respect to the d-line, and v2n is the Abbe number of said negative lens element of said lens unit adjacent to said first lens unit with respect to the d-line.

6. A zoom lens according to claim 1, wherein said last lens unit includes at least one positive lens element with its concave surface toward the object side and at least one negative lens element with its concave surface toward the object side and satisfies the following conditions:

$$0.3 < |fe|/fw < 0.85$$

$$0.4 < \Delta Bf/(ft - fw) < 0.85$$

where fe is the focal length of said last lens unit and $\Delta Bf$ is the moving quantity of said last lens unit upon zooming from the wide angle end to the telephoto end.

7. A zoom lens according to claim 1, wherein said first lens unit and said last lens unit are interlocked for movement upon zooming from the wide angle end to the telephoto end.

8. A zoom lens comprising in the following order from the object side:

a first lens unit having positive refractive power and including a positive cemented lens having a positive lens element and a negative lens element, a cemented concave surface of the negative lens element facing the object side;

a second lens unit having positive refractive power; and a last lens unit having negative refractive power, wherein, upon zooming from a wide angle end to a telephoto end, at least said first lens unit and said last lens unit move toward the object side so as to increase an air gap between said first lens unit and said second lens unit but to decrease an air gap between said second lens unit and said last lens unit, said zoom lens satisfying the following conditions:

$$0.7 < f1/(fw \cdot ft)^{\frac{1}{2}} < 1.4$$

$$0.08 < fw \cdot (N1n - N1p)/|r1m| < 0.5$$

where f1 is the focal length of said first lens unit, fw is the focal length of the entire lens system at the wide angle end, ft is the focal length of the entire lens system at the telephoto end, N1p is the refractive index of said positive lens element in said first lens unit with respect to the d-line, N1n is the refractive index of said negative lens element in said first lens unit with respect to the d-line, and r1m is the radius of curvature of the cemented concave surface in said first lens unit.

9. A zoom lens according to claim 8, wherein said zoom lens satisfies the following condition:

$$[0.08 < fw \cdot (N1n - N1p)/|r1m| < 0.5]$$

$$35 < (v1p - v1n)$$

where v1p is the Abbe number of said positive lens element in said first lens unit with respect to the d-line and v1n is the Abbe number of said negative lens element in said first lens unit with respect to the d-line.

10. A zoom lens according to claim 8, wherein said second lens unit includes, on the closest-to-object side, a negative lens element with its concave surface toward the object side and satisfies the following conditions:

$$0.7 < fw \cdot (N2n - 1)/|r21| < 2.0$$

$$43 < v2n$$

where r21 is the radius of curvature of an object-side surface of said negative lens element of said second lens unit, N2n is the refractive index of said negative lens element of said second lens unit with respect to the d-line, and v2n is the Abbe number of said negative lens element of said second lens unit with respect to the d-line.

11. A zoom lens according to claim 8, wherein said last lens unit includes at least one positive lens element with its concave surface toward the object side and at least one negative lens element with its concave surface toward the object side and satisfies the following conditions:

$$0.35 < |fe|/fw < 0.85$$

$$0.4 < \Delta Bf/(ft - fw) < 0.85$$

where fe is the focal length of said last lens unit and $\Delta Bf$ is the moving quantity of said last lens unit upon zooming from the wide angle end to the telephoto end.

12. A zoom lens according to claim 8, wherein said first lens unit and said last lens unit are interlocked for movement upon zooming from the wide angle end to the telephoto end.

* * * * *